(12) United States Patent
Steinway et al.

(10) Patent No.: US 7,312,742 B2
(45) Date of Patent: Dec. 25, 2007

(54) COMPUTERIZED TOMOGRAPHY USING RADAR

(75) Inventors: William Steinway, Smyrna, GA (US); David H. Fine, Cocoa Beach, FL (US); Steve Cole, Orlando, FL (US)

(73) Assignee: L-3 Communications Security and Detection Systems, Inc., Woburn, MA (US)

( * ) Notice: Subject to any disclaimer, the term of this patent is extended or adjusted under 35 U.S.C. 154(b) by 0 days.

(21) Appl. No.: 11/421,013

(22) Filed: May 30, 2006

(65) Prior Publication Data

US 2007/0035437 A1  Feb. 15, 2007

Related U.S. Application Data

(60) Provisional application No. 60/685,658, filed on May 31, 2005.

(51) Int. Cl.
   G01S 13/89  (2006.01)
   G01S 13/88  (2006.01)
   G01N 22/00  (2006.01)
   G01S 13/00  (2006.01)

(52) U.S. Cl. .............................. 342/22; 342/59; 342/89; 342/128; 342/129; 342/175; 342/176; 342/179; 342/195

(58) Field of Classification Search .................. 342/21, 342/22, 25 R–25 F, 59, 118, 128–133, 175, 342/176, 179, 195, 89
See application file for complete search history.

(56) References Cited

U.S. PATENT DOCUMENTS

| | | | | |
|---|---|---|---|---|
| 3,351,936 A | * | 11/1967 | Feder ........................... | 342/22 |
| 3,665,466 A | * | 5/1972 | Hibbard ........................ | 342/59 |
| 5,325,095 A | * | 6/1994 | Vadnais et al. ................ | 342/22 |
| 5,499,029 A | * | 3/1996 | Bashforth et al. ............. | 342/22 |
| 5,592,170 A | * | 1/1997 | Price et al. .................... | 342/22 |
| 6,057,761 A | | 5/2000 | Yuki | |
| 6,600,441 B2 | * | 7/2003 | Liedtke et al. ................ | 342/22 |
| 6,664,914 B2 | * | 12/2003 | Longstaff et al. .............. | 342/22 |
| 6,700,526 B2 | * | 3/2004 | Witten .......................... | 342/22 |
| 6,831,590 B1 | | 12/2004 | Steinway et al. .............. | 342/22 |
| 6,965,340 B1 | * | 11/2005 | Baharav et al. ............... | 342/22 |
| 6,967,612 B1 | * | 11/2005 | Gorman et al. ............... | 342/22 |
| 7,034,740 B2 | * | 4/2006 | Witten .......................... | 342/22 |

(Continued)

FOREIGN PATENT DOCUMENTS

WO   WO 2005/119214 A1   12/2005

OTHER PUBLICATIONS

J.W. Lane, Jr. et al., "Borehole Radar Tomography Using Saline Tracer Injections To Image Fluid Flow In Fractured Rock"; posted on the U.S. Geological Survey website as of Nov. 1, 2001 at usgs.gov.*

(Continued)

*Primary Examiner*—Bernarr E. Gregory
(74) *Attorney, Agent, or Firm*—Fish & Richardson P.C.

(57) ABSTRACT

Sensing characteristics of an object includes transmitting a stepped-frequency radar through an object and detecting, with multiple receiving structures, deflected portions of the radar signal. The detected portions are processed to generate processed data including information associated with amplitudes and phases of the deflected portions, and with the locations of the receiving structures at which the deflected portions were detected. The processed data is analyzed to determine information corresponding to dielectric properties particular positions within the object.

22 Claims, 9 Drawing Sheets

U.S. PATENT DOCUMENTS

2003/0184467 A1* 10/2003 Collins .................. 342/22
2004/0090359 A1    5/2004 McMakin et al. ......... 342/22
2005/0062639 A1*  3/2005 Biggs .................... 342/22

OTHER PUBLICATIONS

Partial International Search Report mailed Oct. 26, 2006 issued in International Application No. PCT/US2006/021345, pp. 1-2.

W.C. Chew et al., "Nonlinear Diffraction Tomography: The Use of Inverse Scattering for Imaging," International Journal of Imaging Systems and Technology, Wiley and Sons, vol. 7, No. 1, Mar. 21, 1996, pp. 16-24.

William H. Weedon et al., "Step-frequency radar imaging for NDE and GPR applications," Proceedings of the SPIE—The International Society for Optical Engineering USA, vol. 2275, 1994, pp. 156-167.

* cited by examiner

United States Patent US 7,312,742 B2

COMPUTERIZED TOMOGRAPHY USING RADAR

CROSS-REFERENCE

This present application claims priority from U.S. Provisional Application No. 60/685,658 filed May 31, 2005, which is titled "Computerized Tomography Using Radar," the entire contents of which is incorporated by reference.

TECHNICAL FIELD

This description relates to determining the internal properties of objects.

BACKGROUND

In order to detect internal characteristics of an object, such as a piece of luggage, x-rays may be used to generate an image of the internal characteristics of the object. In particular, X-rays react differently with objects of higher density, such as a metal gun, than with objects of lower density, such as a comb. By measuring such differences, images may be generated.

SUMMARY

Radar tomography may be used instead of, or in addition to, x-ray-based inspection. Radar tomography involves the processing of wideband radar signals to characterize and image the internal structures of objects in a non-invasive manner. Such a system has a broad range of uses including transportation security and medicine. For example, in the security field, the system may be used to screen luggage for threats and contraband. In the medical field, the system may be used for diagnostic imaging.

Traditionally, these tasks have been performed by x-ray devices which provide excellent high resolution images due to the small wavelengths of the x-ray energy. While radar, with its much longer wavelengths may not achieve similar resolution, it can provide an image at far lower cost, with lower power requirements, and reduced hardware complexity.

In one general aspect, sensing characteristics of an object includes transmitting a stepped-frequency radar signal through an object and detecting, with multiple receiving structures, deflected portions of the radar signal. The detected portions are processed to generate processed data including information associated with amplitudes and phases of the deflected portions, and with the locations of the receiving structures at which the deflected portions were detected. The processed data is analyzed to determine information corresponding to dielectric properties of particular positions within the object.

Implementations may include one or more of the following features. For instance, detecting deflected portions of the radar signal may include sequentially detecting with multiple receiving structures such that only a single receiving structure actively detects at a time, or detecting with multiple receiving structures concurrently. Detecting deflected portions of the radar signal also may include sequentially detecting signals from different groups of receiving structures. Receiving structures within a particular group may detect signals concurrently.

Multiple transmitting structures may transmit a frequency within the stepped-frequency radar signal. At least two of the transmitting structures may transmit a different frequency. Detecting deflected portions of the radar signal may include detecting with multiple receiving structures concurrently. Detecting deflected portions of the radar signal may include detecting with receiving structures that surround the object. Detecting deflected portions of the radar signal may include detecting with receiving structures that form a shape that is not round, or a shape that is three dimensional.

An image may be formed using the analyzed data. The image may display areas inside the object and corresponding information associated with dielectric levels. Multiple transmissions or detections of multiple locations of the object may be used to form the image in three dimensions. The radar tomography system may be used in conjunction with an x-ray system. For example, results of a first scan using computerized tomography of x-rays may automatically trigger the transmission of a stepped-frequency radar signal only if the results of the first scan suggest that the radar signal may provide useful information. The automatically triggered transmission may be targeted automatically to a specific physical location of the object for which the results of the first scan suggest use of the radar signal may be useful.

Further, the processing or analyzing may include adjusting information associated with the phase or amplitude based upon the receiving structure, such that processing or analyzing associated with different receiving structures is adjusted differently. Adjusting the processing or analyzing may include adjusting information associated with the phase or amplitude based upon the physical characteristics of the object to be scanned, where processing or analyzing associated with different physical characteristics is adjusted differently. The physical characteristics may include dielectric properties of one or more layers in the object, and the dielectric properties may be measured or estimated based on the detected deflecting portions.

Also, the object may be moved or vibrated during the transmission of the stepped-frequency radar signal and the detecting of the deflected portions. A Doppler shift in the deflected portions may be used to distinguish detected portions of the signal that have been deflected from the object from other detected signals. The Doppler shift may be associated with movement of the object by a conveyer belt, or with vibration of the object by a vibrating platform.

In another general aspect, a device for sensing characteristics includes one or more transmission structures configured to transmit a stepped-frequency radar signal including multiple frequencies through an object and receiving structures configured to detect deflected portions of the radar signal. The device also includes a processor configured to process the detected portions to generate processed data including information associated with the amplitude and phase of the detected portion, and the receiving structure in which the reflected portion was detected and an analyzer configured to analyze the processed data to determine information corresponding to dielectric properties of the object and an associated position within the object of the information corresponding to dielectric properties.

In a further general aspect, a device for sensing characteristics includes means for transmitting a stepped-frequency radar signal including multiple frequencies through an object and means for detecting, with receiving structures, deflected portions of the radar signal. The device also includes means for processing the detected portions to generate processed data including information associated with the amplitude and phase of the detected portion, and the receiving structure in which the reflected portion was detected, and means for analyzing the processed data to determine information corresponding to dielectric properties of the object and an associated position within the object of the information corresponding to dielectric properties.

The details of one or more implementations are set forth in the accompanying drawings and the description below. Other features will be apparent from the description and drawings, and from the claims.

DESCRIPTION OF DRAWINGS

Like reference symbols in the various drawings indicate like elements.

DETAILED DESCRIPTION

To map internal characteristics of an object, a stepped-frequency radar signal may be transmitted through the object, which deflects portions of the signal. The deflected portions of the signal may be analyzed using computerized tomography to reveal internal characteristics of the object. In particular, a radar signal striking an object will be deflected based on the dielectric properties of the object. A signal deflected by a low dielectric material will exhibit lower signal strength (i.e., signal amplitude) than a signal deflected by a high dielectric material.

In various implementations, a series of receiving antennas are arranged to form a circumference around an object to be detected. A signal is transmitted towards an object, and the receiving antennas detect deflected portions of the signal. The detected portions of the signal received by the different receiving antennas are processed, with the processing taking into account the amplitude and phase of a detected signal, the position of the associated receiving antenna, and the position of the transmitting antenna that generated the signal. The amplitude is indicative of dielectric properties at a point location that reflected the signal, and the phase and the positions of the transmitting and receiving antennas are indicative of the location in space of the point location. By analyzing the information associated with amplitude, phase, and position of the receiving antenna, a dielectric level may be determined for a point in space.

Computerized tomography may be carried out by determining data for a number of point locations (e.g., pixels) of an object and combining the point locations to form a two-dimensional representation (e.g., a map) corresponding to the dielectric level of the object. Successive two-dimensional representations may be combined to form a three dimensional representation.

The above process may be used to scan luggage including multiple grouped non-metallic and metallic objects to detect weapons or explosives that might otherwise not be detected. For example, while objects with substantially different densities, such as a knife and a comb, may be easily detected using X-ray scanning, objects of similar density, such as a salami and a plastic explosive, may be missed. Since many objects with similar densities have substantially different dielectric properties, computerized radar tomography may be used to identify and distinguish their presence.

Figure 1:
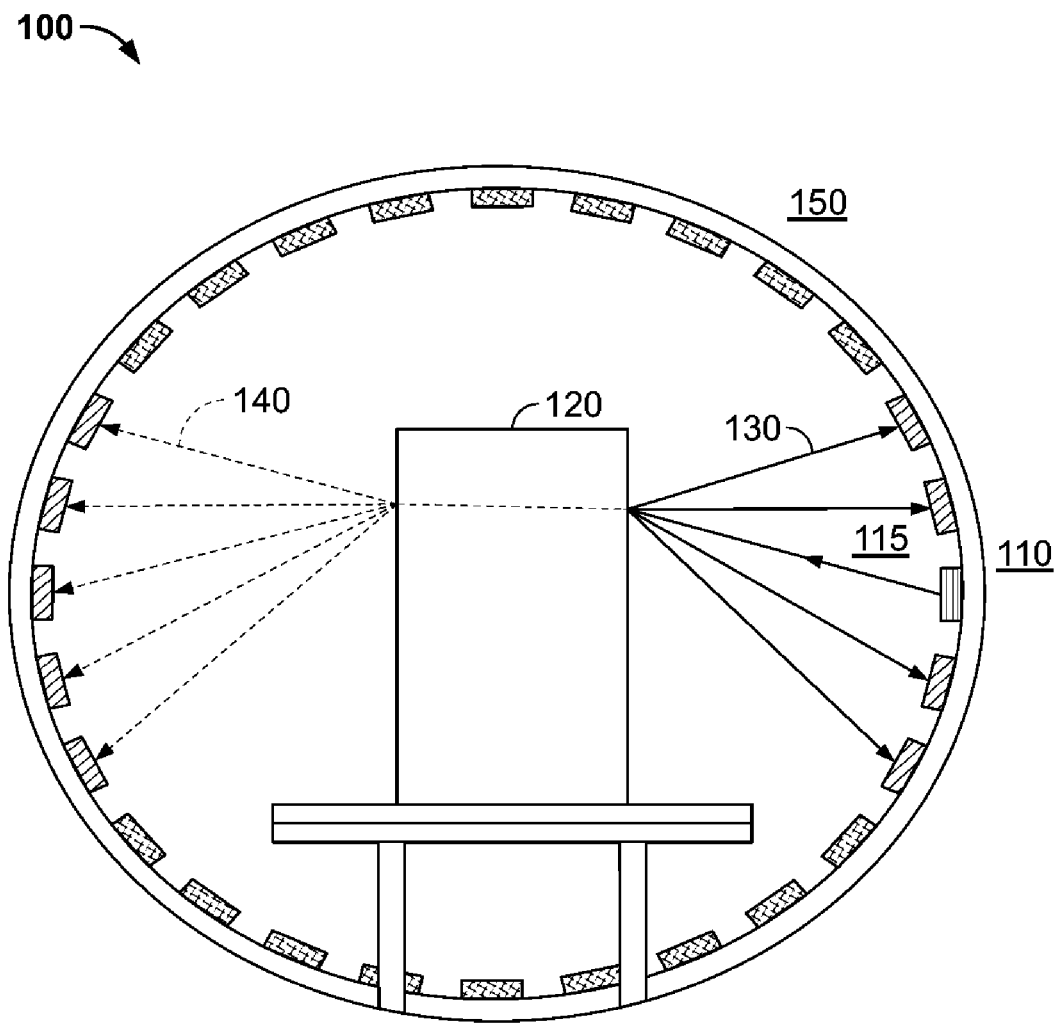
FIG. 1 illustrates an exemplary cross section of a device for scanning objects using computerized radar tomography.

Referring to FIG. 1, a system 100 for scanning objects using computerized radar tomography includes a series of elements that form a circumference 150 surrounding an object 120. A particular element may be a transmit element configured to transmit a radar signal, a receive element configured to receive a deflected radar signal, or a transceive element configured to transmit and receive a radar signal. In certain implementations, each of the elements is a transceive element that may both transmit and receive radar signals.

In the system 100, a transmit element 110 emits a stepped frequency radar signal 115 in the direction of an object 120. Based on the dielectric properties of the object 120, part of the signal is deflected. The deflected signal 130 may be detected by multiple receive elements located along the circumference of elements 150. Parts 140 of the signal may transmit through the object 120 and be detected by multiple other receive elements. For a detected signal, information associated with the phase and amplitude of the signal, as well as the location of the element that received the signal, is processed. The processed information is analyzed to determine data associated with a dielectric level at a series of point locations which may be used to generate an image.

A single frequency or multiple frequencies may be transmitted concurrently. Also, a single element or multiple elements may detect the signal concurrently. The amount of overlap in frequency transmission or signal detection may be adjusted order to control the speed of the process and the complexity of the device design.

In one implementation, an element transmits a single frequency in the stepped-frequency radar signal that may be detected, sequentially, by a series of receive element over a period of time. In other words, a single element detects a signal corresponding to the frequency for a short period, then another receive element detects the signal corresponding to the frequency, then this process continues until all receive elements have "listened" for signals at the given frequency. The frequency then is transmitted by another element, and may also be detected, sequentially, by receive elements for a period of time. The process continues until all transmit elements around the circumference have transmitted the frequency and the transmitted frequency has been "listened" to by all receive elements. Next, another frequency in the stepped-frequency radar signal is transmitted and the process repeats until all frequencies have been transmitted and received.

In particular implementations, to increase the speed of the process, two or more of the receive elements concurrently detect a transmitted signal of a particular frequency that is transmitted by a transmit element. The receive elements that concurrently detect a signal may include all of the receive elements or a subset of the receive elements. In one implementation, there is a sequence of subsets that each detects for a period until all receive elements have "listened." This process enables detection by all of the receive elements within a shorter period of time. The same frequency is then transmitted by another element, and this frequency may also be detected concurrently by all receive elements or by a subset of receive elements. Next, another frequency, or set of frequencies, is transmitted and the process repeats. In one implementation, multiple transmit elements concurrently transmit differing frequencies of a signal and the two or more receive elements concurrently detect the transmitted signal.

After determining data for a series of point locations, a two dimensional image that represents a cross-section of the object may be generated. The object, or the elements, may be adjusted, and another set of data for a series of point locations may be generated, or multiple scans from multiple rings of elements may be operated concurrently. Using this process, a series of two dimensional image slices may be combined to form a three dimensional image of an object and its internal dielectric characteristics. For example, using a display, an image of a scanned piece of luggage may show a plastic explosive contrasted with an adjacent inert object of similar density.

The system 100 may be used for generating images of living tissue. For example, the object 120 may be a piece of tissue that is being scanned to detect areas with increased blood-flow, such as tumors or precancerous growths. The system 100 may be particularly useful in scanning areas that are relatively close to the surface of the skin, where a greater dichotomy between water content in an area and adjacent tissue may be present.

The previous description is an example system, and other systems may be organized differently. For example, the elements need not form a circumference around the object, and may form other shapes that are two or three dimensional.

Figure 2:
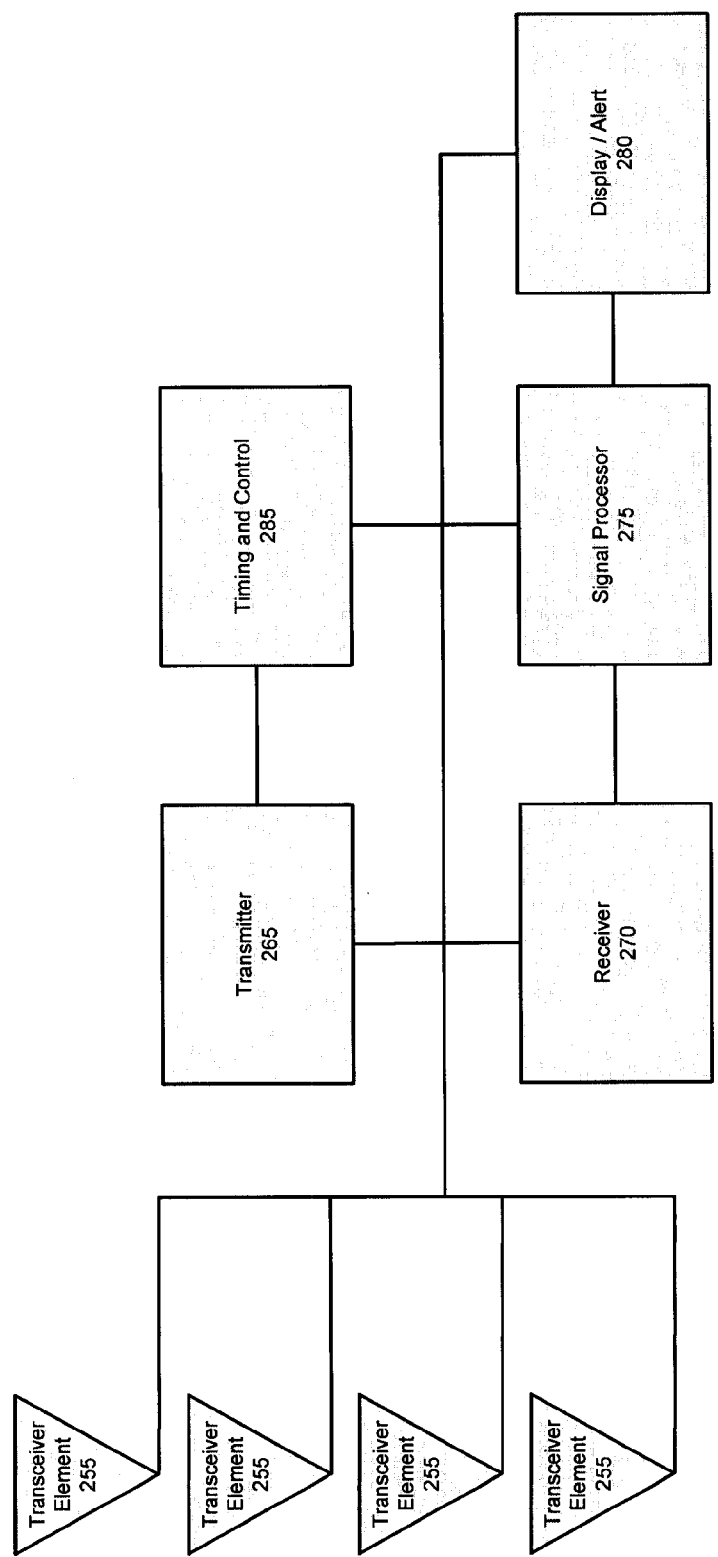
FIG. 2 is a block diagram of an exemplary computerized radar tomography system.

Referring to FIG. 2, a system 200, such as a stepped-frequency radar scanner, includes transceiver elements for transmitting and receiving a stepped-frequency radar signal to analyze objects. The system 200 is shown as a series of transceive elements 255 connected to a radar transmitter 265 and a radar receiver 270. As shown, the system 200 may be particularly well suited to transmit from a transceiver element 255 operating as a transmit element, and to concurrently receive from a single transceiver element operating as a receive element. Other implementations may have multiple radar transmitters 265 or radar receivers 270 to facilitate concurrent transmission and receiving from multiple transceiver elements. In one implementation, the transceive elements 255 are replaced with separate transmit and receive elements.

The transceive elements 255 may be connected to a radar transmitter 265 that generates an RF signal to be transmitted toward an object to be analyzed. The RF signal includes frequencies that cover a bandwidth in increments of frequency steps. For example, the signal may include a nominal frequency operating with a center frequency in the UHF, L, S or X bands.

The transceive elements 255 may be connected to a radar receiver 270 that receives the deflected RF signals from the object. The radar receiver 270 may filter or convert the received signals to signal data in a usable format, and is coupled to a signal processing system 275 that processes the data. The signal processing system 275 is coupled to a display 280 and a timing and control module 285. The display 280 may provide an audible and/or a visual alert when an object is detected by the scanner, or may generate two-dimensional or three-dimensional images of the scanned object. The timing and control module 285 may be connected to the transceive elements 255, the radar transmitter 265, the radar receiver 270, the signal processor 275, and the display 280. The timing and control module 285 may provide signals, such as a clock signal and control signals, to the other components of the system 200. In various implementations, the timing and control module 285 uses switches to sequentially couple the radar transmitter 265 and the radar receiver 270 to an appropriate transceive element in order to scan the object.

Implementations may employ scanning processes that combines computerized tomography of radar signals ("CTR") with computerized tomography of x-rays (CTX). In particular, a sequential or concurrent transmission of x-rays may be used to scan other characteristics of the object. In one implementation, a scan using CTX is conducted, and the results may trigger a scan using CTR. For example, a scan using CTX may show an area that is not easily characterized, such as a dark area in a piece of luggage (e.g., scan results of a metal container in the luggage). The signal processor 275 may automatically recognize the deficiency of the scan using CTX and initiate a scan of the area using CTR. In another implementation, the order of the process is reversed, and the scan using CTR is conducted first and may result in a scan using CTX. Differing characteristics of objects to be scanned, or differing characteristics to be searched for while scanning, may be conducive to one method over the other.

Particular implementations may employ phase or amplitude corrections of the received signal. The location of the point to be scanned, the location of the transmit or receive elements, the electrical and physical properties of system 200, or the dielectric properties of the object may all introduce errors or distortions into the signal that may lower precision of generated data. The receiver 270 or processor 275 may automatically correct the phase or amplitude of the received signal based on known properties, such as element location or other properties of system 200.

In particular, differing dielectric properties within an object may introduce an error in the deflected signal. This error may be similar to the effect of shining a light through mediums of multiple densities, such as, for example, the distortion produced by observing light that transmits through the glass and water of an aquarium. If known, the error may be corrected using the dielectric properties of the object. If not known, the dielectric properties of an object may be estimated by scanning and using iterative calculations.

The previous description is an example implementation, and other system may be organized differently. For example, the receiver 270 and the transmitter 265 may be organized together.

Figure 3:
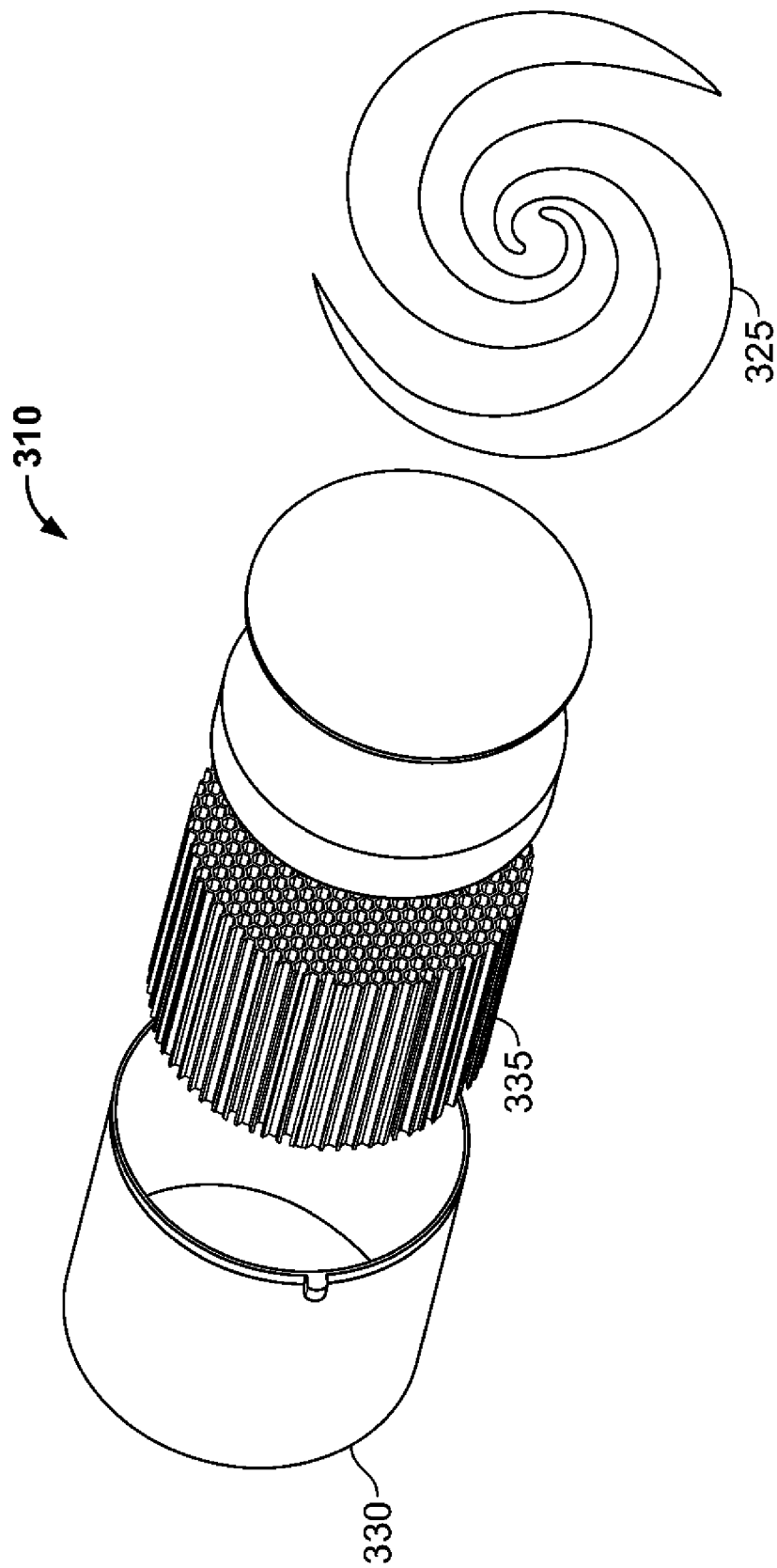
FIG. 3 illustrates an exemplary antenna design.

FIG. 3 illustrates aspects of an element design 300 that may be used in various implementations of the device of FIG. 1. The design 300 includes a transmit element 310, and, in some implementations, may include a receive element or a transceive element. As shown, the design 300 employs a spiral antenna 325 that supports a wide bandwidth. The input impedance and the radiation patterns will vary little over the frequency range used. The spiral element 325 may be constructed by etching a spiral pattern on a printed circuit board. A planar, printed circuit, spiral element radiates perpendicularly to the plane of the spiral. The spiral 325 is located at the end of a cylindrical metal cavity 330 (the cavity back) to provide isolation from neighboring elements and electronics. Typically, an absorber 335 is used on the top side of the spiral inside the cavity 330 to make sure the element responds only in one direction.

The previous description provides an exemplary implementation of an element design. Other implementations may include different features, such as an endfire waveguide antenna. Such a configuration may be slightly larger than the spiral configuration. The endfire waveguide antenna reduces the signal spot size, thus making the exact position at which the signal is reflected easier to locate. Other suitable types of wideband elements may also be used.

Figure 4:
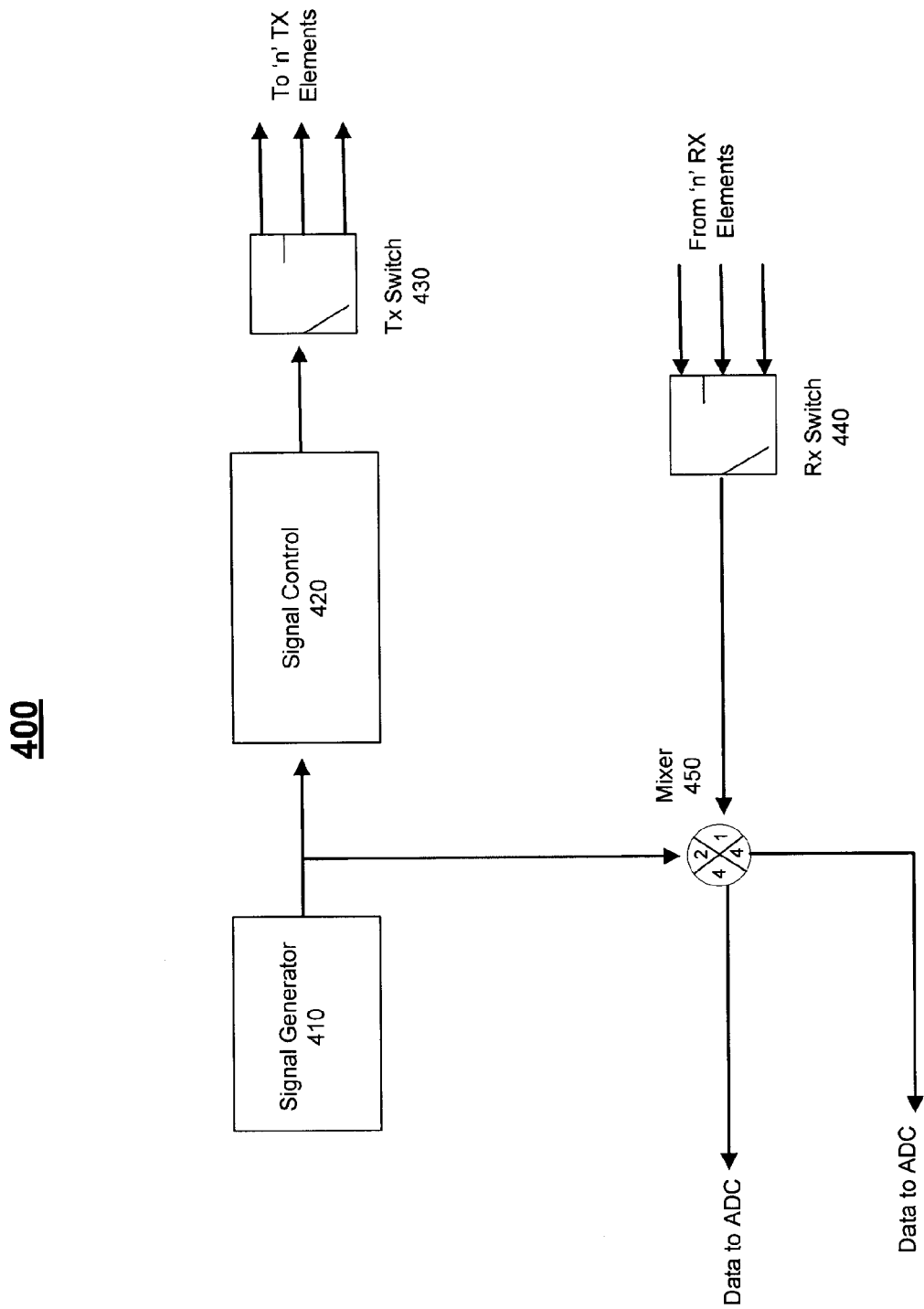
FIG. 4 is a block diagram of an exemplary system to transmit and receive a radar signal.

Referring to FIG. 4, an exemplary system 400 to transmit and receive a radar signal includes a signal generator 410, a signal control 420, a transmit switch connecting 'n' transmit or transceive elements 430, a receive switch connecting 'n' receive or transceive elements 440, and a mixer 450, which may be in the form of a quadrature demodulator.

The conversion system 400 may be used in the system 200. In this case, the signal generator 410 may be included in the transmitter 265, the signal control 420 and the switches 430 and 440 may be included in timing and control 285, and the mixer 450 may be included in the receiver 270.

In the system 400, a transmission signal is generated and transmitted through a transmit element. Reflected portions of the transmitted signal are received through a receive element, which may optionally be the same element as the transmit element. The transmitted signal and the generated signal are input to the mixer 450, which outputs an in-phase signal and an out-of-phase (quadrature) signal.

The signal generator 410 generates a signal to be broadcast by the antenna. The signal generator 410 may include a phase lock loop synchronized to a crystal oscillator. The signal generated by the signal generator 410 is input to a mixer 450 and to a signal control 420. The signal control 420 may amplify or otherwise condition the signal to enable transmission by the transmit element. The signal control 420 provides the signal to a transmit element through the transmit switch 430. The transmit switch 430 enables the signal generator 410 to transmit the signal using one or more transmit elements out of 'n' transmit elements. The receive switch 440 enables one or more receive elements out of 'n' receive elements to send a received signal to the mixer 450. The transmit and receive switches 430 and 440 may include, for example, single pole double throw (SPDT) switches and/or a computerized control system. In one implementation, all elements are transceive elements, and a single switching system replaces the transmit and receive switches 430 and 440.

The transmit element emits the controlled signal and strikes objects in the environment. Portions of the transmitted signal may be reflected. The reflected portions, which may exhibit any of an amplitude, frequency, or phase shift, are received by the receive element. The receive element inputs the received signal to a receive switch 440 that enables connection of the signal to the mixer 450.

Some implementations may use other mechanisms, such as a control system, in place of the transmit switch 430 and the receive switch 440. In one implementation, the receive element is input directly to a mixer without a switch.

The mixer 450 receives the signal from the signal generator 410 in an input. In another input, either the transmission signal or the received signal may be received by the mixer 450, based upon the transmit switch 430 and the receive switch 440. The mixer 450 converts input signals to a form that is more easily processed, such as, for example, an in-phase and an out of phase component at a baseband frequency. Various implementations do not directly input the signal generator 410 to the mixer 450.

As shown, the mixer 450 is a quadrature demodulator, though other signal conversion systems may be used. The quadrature demodulator outputs "I" and "Q" data (referred to as IQ data). The output signals may be analyzed, to determine any of an amplitude, frequency, or phase shift between transmitted and received signals that may be indicative of dielectric characteristics of an object. In some implementations, separate IQ data may be generated for each transmitted frequency.

The previous description is an example implementation of the transmit and receive system. Other implementations may include different components. For example, in various implementations, multiple mixers or other components may be included to facilitate transmission or receiving of multiple frequencies, and/or by multiple element, concurrently.

Figure 5:
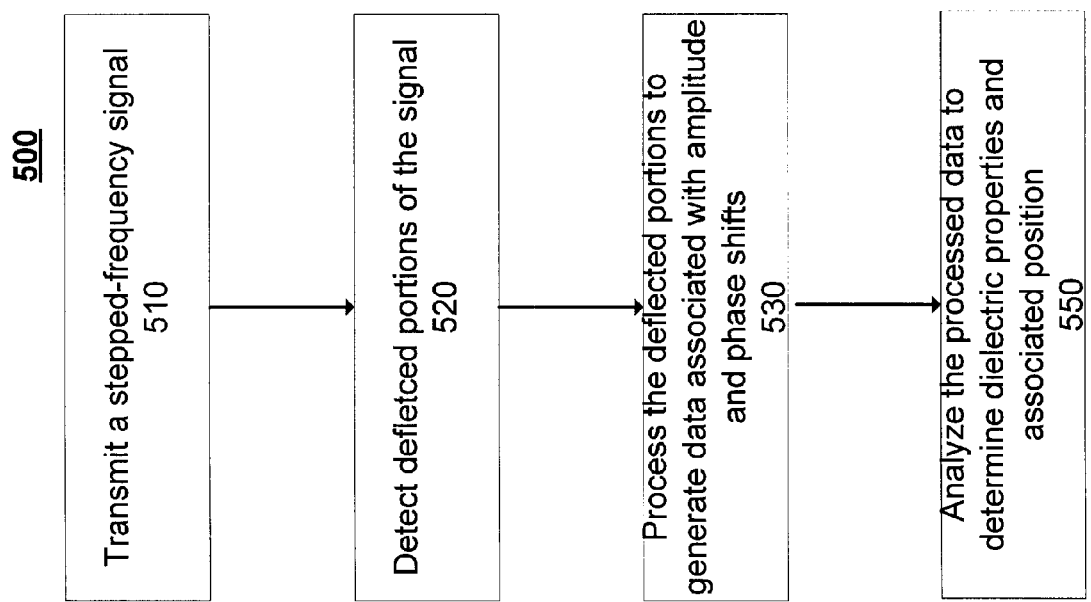
FIG. 5 is a flow chart of an exemplary method using computerized radar tomography to scan objects.

FIG. 5 shows a process 500 to scan objects using CTR. The process 500 may be implemented on the system 100 of FIG. 1 or another system. The process 500 begins when a stepped-frequency signal is transmitted by an element (510). The stepped-frequency radar signal may be a radar signal including multiple frequencies and phases that are transmitted concurrently or consecutively. The radar may change frequencies in steps or continuously. In one implementation, each transmission cycles through a frequency bandwidth that includes multiple transmitted frequencies that are separated by frequency steps. In the implementation, while cycling through the bandwidth, each frequency is transmitted for a period of time, followed by the next frequency, until the bandwidth has been crossed. In another implementation, the signal frequency is swept from a low frequency to a higher frequency, with frequencies between the low and high frequency being transmitted. Although multiple frequencies may be sent, one after another, the transmitted and received signals are discussed as a single signal to simplify discussion. After transmission, the signal strikes an object and may be deflected based on the dielectric characteristics of the object.

One or more elements detect deflected portions of the signal (520). The elements may be arranged along a line, curve, circumference, or other shape. The detected signal includes an amplitude, phase, and/or frequency that may have been altered by the object. For example, the amplitude may be affected by the dielectric properties of the object, the phase may be affected by the position of the object, and the frequency may be shifted by movement of the object.

Deflected portions of the signal are processed (530). The processing may identify, for example, information associated with the amplitude and phase of the signal, and the receiving structure in which the deflected portion was detected. The processing may include a correction step to calibrate the data or processing steps based on electrical or physical properties of the device or receiving structure, or based on estimated or actual dielectric properties of the object. The processing may include combining the measurements from some or all of the detected signals. Implementations may adjust for the path lengths and delays due to the material propagation times, and adjust for magnitude changes due to the attenuation of the signals in the different materials. The adjustments for the path lengths may include a phase correction of the signal. The adjustments for the material propagation time and attenuation may include a phase and magnitude correction.

In particular implementations, processing of the deflected portions (530) includes identifying information associated with a frequency shift. The object may be moved to induce a Doppler shift that is used to separate detected signals that are deflected by the object from detected signals that are reflected by other system components or noise signals. For example, if an object is known to be moving, detected signals that do not exhibit a Doppler shift may be discarded. In one implementations, a vibrating platform is used to induce vibrations in the object. In another implementation, a moving conveyer belt is used to induce movement.

The processed data is analyzed to determine information corresponding to dielectric properties of the a particular position within the object (540). This analysis may include, for example, Fourier transforms for multiple integration times, or other processing techniques.

The process 500 is an example implementation of a process to sense moving entities using a stepped-frequency sensor device. Other implementations may include additional or different steps. For example, processing and analyzing the data (530 and 550) may be conducted in a single step.

Figure 6:
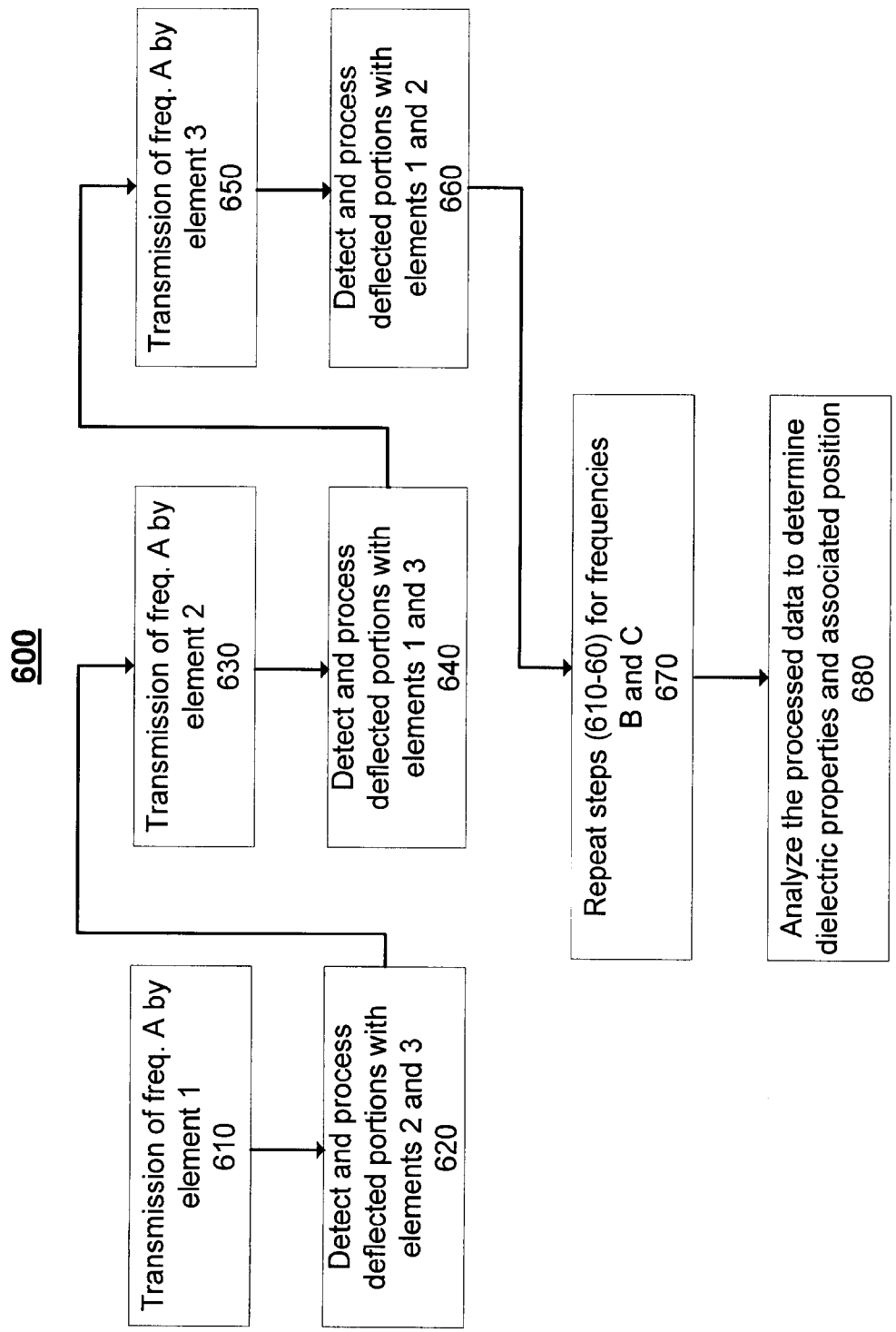
FIG. 6 is a flow chart of an exemplary method using computerized radar tomography to scan objects with multiple receive elements.

FIG. 6 shows a process 600 to scan objects using CRT with multiple receive elements. The process 600 may be implemented on the system 100 of FIG. 1 or another system. FIG. 6 is included to illustrate an exemplary process in which sequential scanning is conducted across multiple elements and multiple frequencies. In the process 600, three transceive elements that each may operate as a transmit or receive element are included. The stepped-frequency radar signal consists of three frequencies, A, B, and C, to be transmitted.

The process 600 begins when a stepped-frequency signal at frequency A is transmitted by element 1 operating as a transmit element (610). Elements 2 and 3 operate as receiving elements to detect deflected portions of the signal transmitted by element 1. The detected portions are processed to generate data associated with amplitude and phase shifts (620). Elements 2 and 3 may detect the deflected portions sequentially or concurrently.

Next, element 2 operates as a transmit element to transmit the stepped-frequency signal at frequency A (630). Elements 1 and 3 operate as receiving elements to detect deflected portions of the signal transmitted by element 2. The detected portions are processed to generate data associated with amplitude and phase shifts (640).

Then, element 3 operates as a transmit element to transmit the stepped-frequency signal at frequency A (650). Elements 1 and 2 operate as receiving elements to detect deflected portions of the signal transmitted by element 3. The detected portions are processed to generate data associated with amplitude and phase shifts (660).

Next, the process (steps 610-660) repeats for the second frequency, B, and then for the third frequency, C (step 670). Finally, the processed data is analyzed to determine dielectric properties and the associated position of the dielectric properties within the object (680).

Some implementations may include additional or alternative steps. For example, the processing of detected signal portions need not be conducted as the detection occurs. In various implementations, the processing occurs after transmission of all frequencies.

Figure 7:
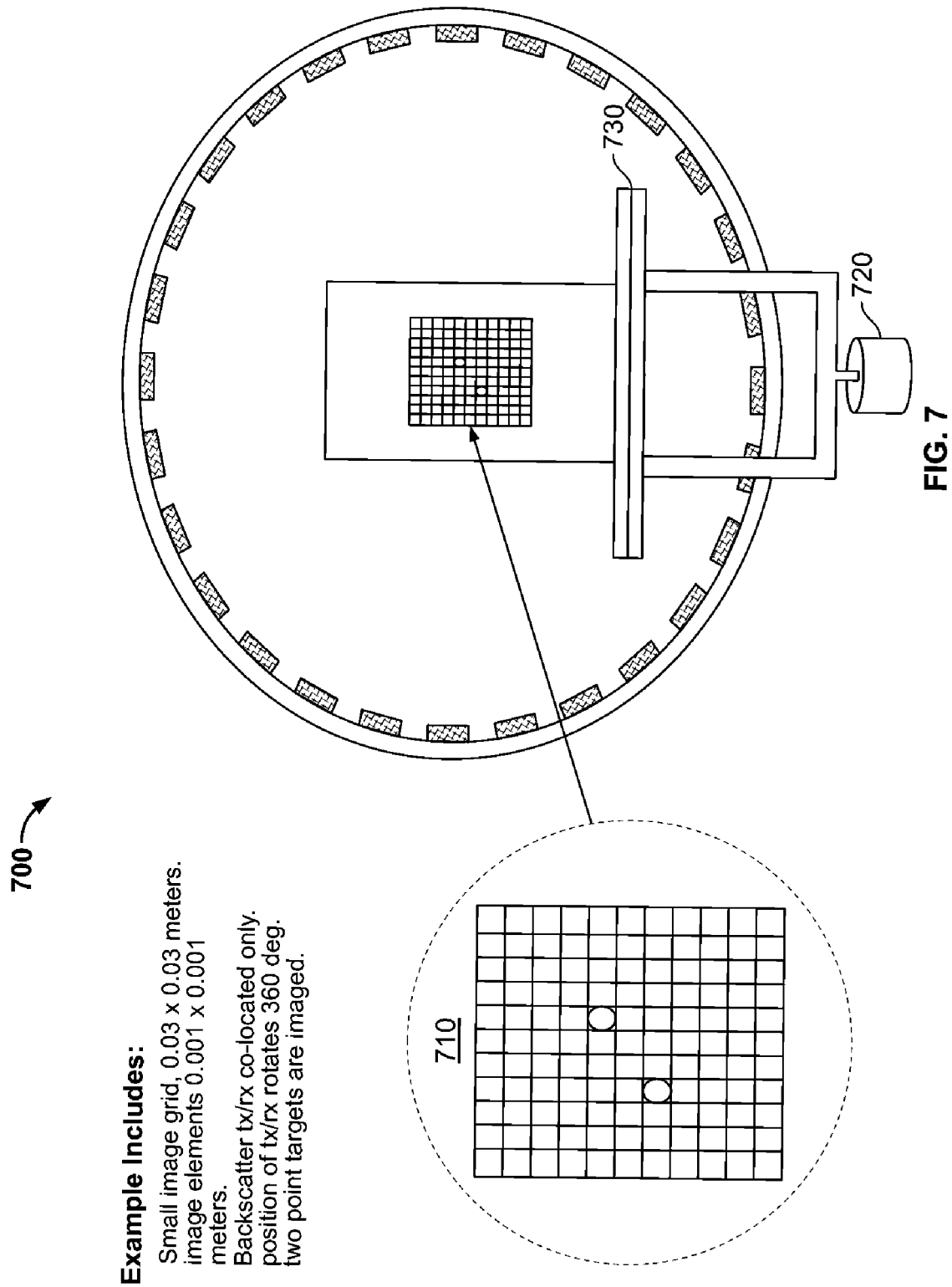
FIGS. 7 and 8 illustrates an exemplary implementation of a device to scan objects using computerized radar tomography and data associated with a scan.
Figure 8:
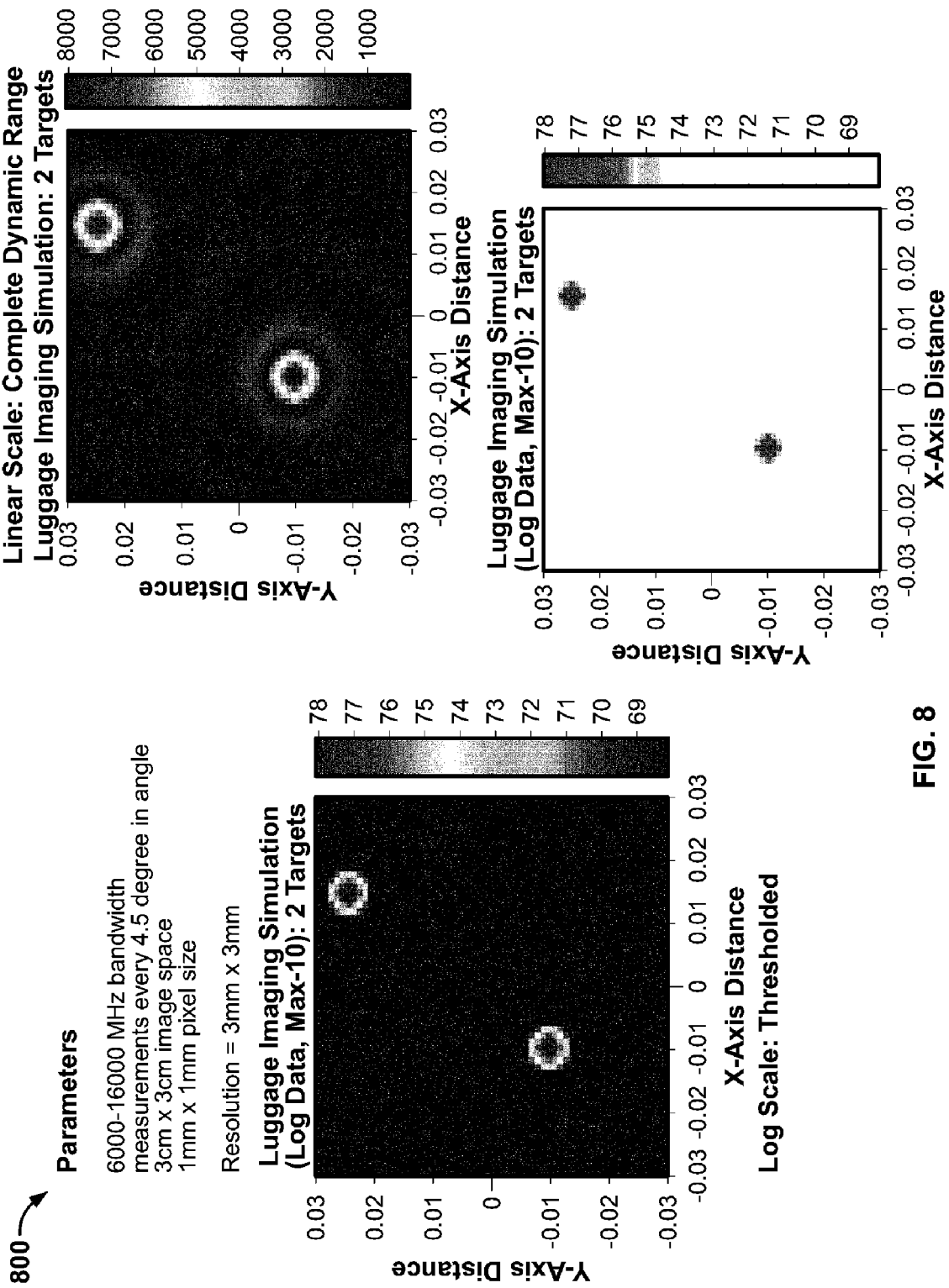

Referring to FIG. 7, an example implementation of a device 700 to scan objects using computerized radar tomography is shown. In the device 700, an object is positioned to be scanned. The object includes two areas that include dielectric properties different from the surrounding dielectric properties in the object. The device 700 includes a vibrating drive 720 and a vibrating conveyer belt to induce movement in the object. Due to the induced movement, portions of the radar signal deflected from the object may exhibit a Doppler shift. The Doppler shift may be used to distinguish detected signals that were actually deflected by the object from noise and detected signals that were deflected by other objects (e.g., system components). FIG. 8 shows an example of results 800 of analyzed data. In the results, the dielectric level is shown as a function of position.

Figure 9:
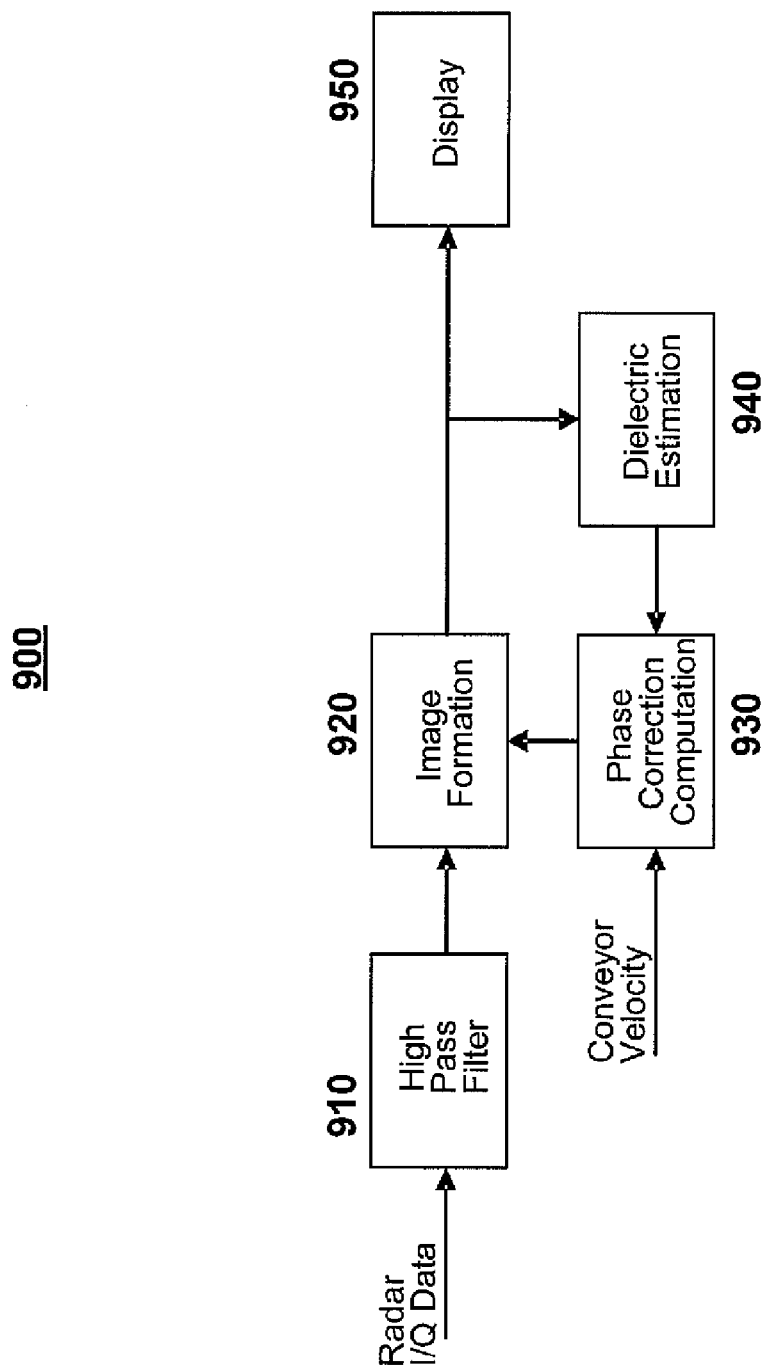
FIG. 9 is a block diagram of an exemplary system to process and analyze signal data.

Referring to FIG. 9, an exemplary system 900 to process and analyze signal data includes a high pass filter 910, an image formation unit 920, a phase correction computation unit 930, a dielectric estimation unit 940, and a display 950. The system 900 is an example of a system for processing and analyzing signal data generated from an object that is moved using a moving conveyer belt.

The output of the radar receiver is in the form of digitized in-phase (I) and quadrature (Q) time samples of the data received by each antenna at each frequency. The output may, for example, be the output of the mixer 450 of FIG. 4. For a system with N antennas and M frequencies, there will be N times M I/Q pair of digital samples collected for one complete revolution around the antenna array, that provides one "look" at the object. Additionally, as the objects moves along the conveyer belt, a broad antenna element transmission field-width (beamwidth) increases visibility of the object both prior to and after passing through the plane of the array, providing multiple "looks" at any given point in the object. The number of available looks, K, is directly proportional to the product of the beamwidth, range to object, conveyer belt rate, and "look" rate. The K "looks" constitute one "dwell" on the object and is comprised of I/Q pairs of digital samples in a quantity of N times M times K.

The samples from each antenna and each frequency are first processed through a digital high-pass filter 910 to reduce interference from the leakage of the transmit signal into the receiver.

The image formation unit 920 performs computation and application of phase corrections to the I/Q data from each dwell followed by summation to affect coherent integration gain and focusing to a grid of points in the plane of the antenna array. The result is a single cross-sectional slice of the object for each dwell. Concatenation of successive slices results in a 3-dimensional image of the object.

The phase corrections computation unit 930 accounts for the change in distance between each grid location being imaged and each receive antenna as the grid of points pass through the antenna array. Using vector notation, the corrections are determined for all samples in a dwell as follows:

$$\varphi_{i,n,m,k} = \frac{2\pi}{\lambda_m} |\vec{P}_{i,k} - \vec{A}_n|$$

where:

$\phi_{i,n,m,k}$ is the phase correction in radians for the $i^{th}$ grid location and a sample from the $n^{th}$ antenna, $m^{th}$ frequency, and $k^{th}$ dwell, $\lambda_m$ is the wavelength corresponding to the $m^{th}$ frequency, $\vec{P}_{i,k}$ is the 3-dimensional position vector to the $i^{th}$ grid position at the $k^{th}$ dwell, and $\vec{A}_n$ is the 3-dimensional position vector to the $n^{th}$ antenna.

Amplitude and phase data for each image grid location are used to estimate dielectric properties 940 and adjust the effective wavelength used in the phase correction computation. This is performed iteratively until the image is fully focused. The resulting image is shown on the display 950.

A number of implementations have been described. Nevertheless, it will be understood that various modifications may be made without departing from the spirit and scope. Accordingly, other implementations are within the scope of the following claims.

What is claimed is:

1. A method of sensing characteristics of an object, the method comprising:
transmitting a stepped-frequency radar signal through an object;
detecting, with multiple receiving structures, deflected portions of the radar signal;
processing the detected portions to generate processed data including information associated with amplitudes and phases of the deflected portions, and with the locations of the receiving structures at which the deflected portions were detected; and
analyzing the processed data to determine information corresponding to dielectric properties, the dielectric properties corresponding to particular positions within the object.

2. The method of claim 1, wherein detecting deflected portions of the radar signal includes sequentially detecting with multiple receiving structures such that only a single receiving structure actively detects at a time.

3. The method of claim 2, wherein detecting deflected portions of the radar signal includes detecting sequentially different groups of receiving structures, wherein receiving structures within a particular group detect concurrently.

4. The method of claim 1, wherein detecting deflected portions of the radar signal includes detecting with multiple receiving structures concurrently.

5. The method of claim 1, wherein multiple transmitting structures transmits a frequency within the stepped-frequency radar signal, wherein at least two of the transmitting structure transmits a different frequency.

6. The method of claim 5, wherein detecting deflected portions of the radar signal includes detecting with multiple receiving structures concurrently.

7. The method of claim 1, wherein detecting deflected portions of the radar signal includes detecting with receiving structures that surround the object.

8. The method of claim 1, wherein detecting deflected portions of the radar signal includes detecting with receiving structures that form a shape that is not round.

9. The method of claim 1, wherein detecting deflected portions of the radar signal includes detecting with receiving structures that form a shape that is three dimensional.

10. The method of claim 1, wherein an image is formed using the analyzed data, wherein the image displays areas inside the object and corresponding information associated with dielectric levels.

11. The method of claim 10, wherein multiple transmission or detections of multiple locations of the object are used to form the image in three dimensions.

12. The method of claim 1, wherein results of a first scan using computerized tomography of x-rays automatically triggers the transmission of a stepped-frequency radar signal only if the results of the first scan suggest the transmission.

13. The method of claim 12, wherein the automatically triggered transmission is targeted automatically to a specific physical location of the object for which the results of the first scan suggest transmission.

14. The method of claim 1, wherein the processing or analyzing includes adjusting information associated with the phase or amplitude based upon the receiving structure, wherein processing or analyzing associated with different receiving structures is adjusted differently.

15. The method of claim 1, wherein the processing or analyzing includes adjusting information associated with the phase or amplitude based upon the physical characteristics of the object to scan, wherein processing or analyzing associated with different physical characteristics is adjusted differently.

16. The method of claim 15, wherein the physical characteristics include dielectric properties of one or more layers in the object, and the dielectric properties are measured or estimated based on the detected deflecting portions.

17. The method of claim 1, wherein the object is moved or vibrated during the transmission of the stepped-frequency radar signal and the detecting of the deflected portions.

18. The method of claim 17, wherein a Doppler shift in the deflected portions is used to distinguish detected portions of the signal that have been deflected from the object from other detected signals.

19. The method of claim 18, wherein the Doppler shift is associated with movement of the object by a conveyer belt.

20. The method of claim 17, wherein the Doppler shift is associated with vibrations of the object by a vibrating platform.

21. A device for sensing characteristics, the device comprising:
one or more transmission structures configured to transmit a stepped-frequency radar signal including a plurality of frequencies through an object;
a plurality of receiving structures configured to detect deflected portions of the radar signal;
a processor configured to process the detected portions to generate processed data including information associated with amplitude, phase, and the receiving structure in which the reflected portion was detected; and
an analyzer configured to analyze the processed data to determine information corresponding to dielectric properties of the object at an associated position, within the object, of the information corresponding to dielectric properties.

22. A device for sensing characteristics, the device comprising:
means for transmitting a stepped-frequency radar signal including a plurality of frequencies through an object;
means for detecting, with a plurality of receiving structures, deflected portions of the radar signal;
means for processing the detected portions to generate processed data including information associated with amplitude, phase, and the receiving structure in which the reflected portion was detected; and
means for analyzing the processed data to determine information corresponding to dielectric properties of the object at an associated position, within the object, of the information corresponding to dielectric properties.

* * * * *